United States Patent [19]

Dreyling, deceased

[11] 3,833,391

[45] Sept. 3, 1974

[54] REFRACTORY COMPOSITION, METHOD OF MAKING, AND PRODUCT

[75] Inventor: Alfred P. Dreyling, deceased, late of East Brunswick, N.J. by Lewis J. Dreyling, executor

[73] Assignee: Quigley Company, Inc., New York, N.Y.

[22] Filed: July 17, 1973

[21] Appl. No.: 379,973

Related U.S. Application Data

[63] Continuation-in-part of Ser. No. 120,756, March 3, 1971, abandoned, which is a continuation-in-part of Ser. No. 828,338, May 27, 1969, abandoned.

[52] U.S. Cl. .................................... 106/58, 106/63
[51] Int. Cl. ............................................ C04b 35/04
[58] Field of Search ................................. 106/58, 63

[56] References Cited
UNITED STATES PATENTS

| | | | |
|---|---|---|---|
| 2,627,476 | 2/1953 | Herndon | 106/106 |
| 3,498,235 | 3/1970 | Martinet | 106/58 |
| 3,582,373 | 6/1971 | Gilpin et al. | 106/58 |

*Primary Examiner*—James E. Poer
*Attorney, Agent, or Firm*—Connolly and Hutz

[57] ABSTRACT

Basic refractory particles are mixed with an ammonium salt binder capable of imparting high green strength and subsequently passing out of the refractory mixture by sublimation or by decomposition and volatilization. The mixture is formed to a predetermined shape and fired to leave the original basic refractory in said given shape and substantially free of binder that would reduce refractoriness. The refractory mixture may be made by forming the binder salt directly on the surface of the refractory particles.

11 Claims, No Drawings

REFRACTORY COMPOSITION, METHOD OF MAKING, AND PRODUCT

CROSS REFERENCE TO RELATED APPLICATIONS

This application is a continuation-in-part of copending application Ser. No. 120,756 filed Mar. 3, 1971, which is in turn a continuation-in-part of application Ser. No. 828,336 filed May 27, 1969, and both now abandoned.

BACKGROUND OF THE INVENTION

Refractories are subjected to a wide range of temperatures in application, and the development of strength over such range is necessary to fully realize the refractory potential. Conventional binders for refractory particles, employed to achieve green strength of refractory shapes, impair strength at high temperature by softening of the bond. This invention relates to refractory compositions and to a method of making a refractory composition which comprises a mixture of refractory and binder particles held in a given shape by a binder for firing, the binder during firing passing substantially in its entirety out of the refractory-binder mixture by sublimation or by decomposition and volatilization to leave the product free of any binder tending to reduce refractoriness.

SUMMARY OF THE INVENTION

In accordance with the present invention predominantly basic refractory compositions are made with improved binders which after serving their binding function pass off by sublimation or by decomposition into volatile constituents upon firing at a temperature of about 1,500° to 3,300°F. to leave no residual ingredients that reduce refractoriness of the compositions or the end products made therefrom. Bonding properties of binders in this class are obtained either by chemical action, physical bonding, or both, or by chemical breakdown into components which react individually with the predominantly basic refractory grains. These binder reactions may occur at elevated temperatures with considerable speed or slower at normal room temperature to set up the refractory ingredient into a hard dense mass.

According to this invention the improved binder compounds are mixed with predominantly basic refractory materials and water to form end products having the densities and strength desired coupled with low shrinkage. The mixtures can be disposed in a predetermined shape by casting, ramming or gunning.

It is an object of the invention to make predominantly basic refractory compositions having binder compounds which impart high green strength but leave practically no objectionable residual ingredients to impair refractory quality in the compositions after firing.

It is a further object to prepare such compositions which may be stored for considerable periods of time before mixing with water preparatory to use.

DETAILED DESCRIPTION OF THE INVENTION

In practicing the invention the improved binder in particulate form is intimately mixed with a basic refractory material in grain or particle form of various sizes. Water is added to the mixture in an amount dependent upon the method to be used in imparting the desired ultimate shape to the refractory composition and the composition is fired while maintaining its desired shape. By way of example, the desired shape may be cast brick, a cavity in a furnace wall which is filled by a ramming or gunning mix, or a coating sprayed on a furnace wall.

The preferred basic refractory material is magnesia. The purer the refractory material the better, but absolute purity is not expected and if the refractory has a purity of 87 percent or better it will suffice. The remainder of such basic refractory material will consist usually of magnesium compounds of iron, calcium, alumina, silicon, chrome oxide, clay and combinations thereof.

Preferably about 70 percent of the basic refractory material is in various grain or particle sizes, some capable of retention on a 16 mesh screen while passing through a 7 mesh screen, some on a 7 mesh screen while passing through a 5 mesh screen, and some on a 5 mesh screen while passing through a ¼ inch screen, the various quantities of such sizes, however, not being critical. The basic refractory material preferably also includes about 20 percent or more of the basic refractory grains or particles capable of passing a 200 mesh screen. These relatively smaller size grains act to fill the interstices between the grains of larger size and impart improved density and strength to the refractory product with a minimum of shrinkage.

The preferred binder compounds, having served their binding function, should be capable of passing off either by sublimation, i.e., directly from a solid to a gaseous state, or by decomposition into constituents which volatilize at the temperatures used, while enabling the refractory material after firing to set up and form a hard dense mass. Firing temperatures required to volatilize the binder will be at least about 1,500°F. Firing may be conducted at temperatures as high as 3,300°F. or even higher, and temperatures of about 2,000 to 3,000°F. will usually be employed.

Binding compounds that can be used to practice the invention are selected from the group which includes ammonium chloride, ammonium fluoride, ammonium fluosilicate, ammonium fluosulfonate, ammonium bromide, ammonium iodide, ammonium bisulfate and ammonium sulfate, all of which are crystalline salts that sublime or whose constituents upon decomposition volatilize under the heat of firing. Characteristically the binders contain the ammonium radical and pass off by completion of the firing stage either by sublimation or by decomposition and volatilization of the component parts.

A preferred commercially available salt having the desired property of sublimation is ammonium sulfate. Another preferred salt is ammonium chloride. Binder levels of about 0.5–10.0 weight percent are employed.

In preparing the basic refractory composition the ammonium salt used may preferably have a particle size capable of passing a 200 mesh screen or finer. Ammonium salt binder in the preferred fine grain size can be obtained by milling, e.g., ball milling. Other ingredients may be mixed with the ammonium salt during milling, e.g., slip agents which coat the ammonium salt crystals to prevent caking and insure desired grinding and later dispersion thereof.

Slip agents that may be used include ammonium stearate, magnesium stearate, polyvinyl alcohol, starches, industrial fly ash, fine silica and organic silica (ethyl silicate), in amounts from 0.1 to 5.0 percent by weight of the total binder content.

If desired, a portion of the basic refractory material, up to approximately 10 percent of the dry weight of the basic refractory mixture, may be ball milled together with the binder to the preferred grain size of the latter.

EXAMPLE I

| Refractory | % by Weight of Total Composition |
|---|---|
| 95% Magnesia | |
| Thru ¼" on 5 mesh screen | 15.00 |
| Thru 5 mesh on 7 mesh screen | 31.00 |
| Thru 7 mesh on 16 mesh screen | 23.00 |
| Pulverized thru 200 mesh screen | 28.00 |
| Binder | |
| Ammonium chloride | 3.00 |
| | 100.00 |
| Ball milled with a portion of the 95% magnesia to pass through 200 mesh screen | |

In this example the ingredients are mixed thoroughly and intimately with water in amount equal to 8 percent of the dry weight of the composition. Standard size test bars (2 inches × 2 inches × 9 inches) are formed by trowelling into suitable molds. The test bars are air dried for 24 hours, oven dried at 220° F. for another 24 hours and then fired at 2,950°F. for 5 hours. The test bars are removed from the mold and cooled to room temperature.

The product of this example was tested against a test sample similarly made from corresponding percentages and sizes of the same ingredients except for substitution for ammonium chloride of 3 percent of the commonly used refractory binder ammonium pentaborate (which does not sublime but deposits a stable borate salt), with results as follows:

Physical Properties after firing at 2950°F.

| | Refractory mixture with | |
|---|---|---|
| | Ammonium Pentaborate | Ammonium Chloride |
| Shrinkage | 2.2% | 1.0% |
| Modulus of Rupture | 2165 psi | 3098 psi |
| Compressive strength at cold crush | 4055 psi | 6300 psi |
| Character of transverse failure | 100% Binder failure | 80% matrix failure 20% binder failure (estimated) |

It is apparent from the foregoing that shrinkage with ammonium chloride is less than half that with an ammonium pentaborate type binder, that the modulus of rupture and the compressive strength at cold crush are considerably higher and that the characteristics of transverse failure are different.

One preferred method of making the improved refractory is by forming the ammonium salt directly on the basic refractory grains. The refractory grains are thoroughly dampened with ammonium hydroxide by intimate mixing throughout the entire mass. The acid corresponding to the salt to be formed (hydrochloric acid where the salt is ammonium chloride) is added and the mass again thoroughly mixed to complete the reaction. Stoichiometric proportions of ammonium hydroxide and acid are used. Refractory compositions prepared according to this method rupture by cleavage of the refractory grains per se in substantial percentages in preference to failure of the bond between the refractory grains. Analysis of the resulting matrices have shown residue from the salt to be extremely low or entirely absent. Such a binder, after firing, leaves little or no residue to contaminate the composition or reduce its refractoriness.

EXAMPLE II

| Refractory | % by weight of Total Composition |
|---|---|
| 95% Magnesia | |
| Thru 16 mesh and finer | 90.0 |
| Binder | |
| Ammonium hydroxide hydrochloric acid | 10.0 |
| | 100.0 |

The ammonium hydroxide in the form of a 10% solution is added to the magnesia in an air-tight mixer, the mixer tightly closed and the mass agitated for approximately 20 minutes or until the magnesia is thoroughly dampened with ammonium hydroxide solution. The hydrochloric acid in the form of a 10 percent solution is then added and the mixture again agitated for 10–15 minutes thoroughly to disperse the acid; when the mix is complete the mixer is vented to dry the treated magnesia.

A product prepared from this example, after forming into test bars as before, firing at 2950° F. and cooling to room temperature, yields the following:

Physical Properties After Firing at 2950°F.

| | |
|---|---|
| Shrinkage | 1.20% |
| Modulus of rupture | 2995 psi |
| Compressive strength at cold crush | 6770 psi |
| Character of transverse failure | 85% matrix failure 15% binder failure (estimated) |

The shrinkage in the test bars made by forming ammonium chloride directly on the magnesia particles is comparable to that observed where ball milled ammonium chloride is used alone as the binder as in Example I, while the modulus of rupture and the compressive strength at cold crush are of the same high order, demonstrating the superiority of the improved binder compounds and of the improved method. The advantage is also reflected in the characteristics of transverse failure, the bond being less prone to fracture than the matrix itself.

EXAMPLE III 95 percent Magnesia particles are bonded with 3 percent ammonium sulfate and with 3 percent ammonium chloride by dry mixing granular ammonium salt with the refractory grain prior to water addition. As a control, test pieces are also prepared from the same refractory grain, omitting the ammonium salt.

Test pieces formed in this way are dried at 220°F. and fired at 1,500°F., 2,000°F. and 3,000°F. for 3 hours to insure that the ammonium salt is driven off. Physical properties obtained are as follows:

| Treatment Temperature: | 220°F. | 1500°F. | 2000°F. | 3000°F. |
|---|---|---|---|---|
| | | 3% Ammonium Sulfate | | |
| Density lb/ft³ | 165.1 | 159.5 | 159.0 | 162.2 |
| Linear Shrinkage, % | 0 | 0.22 | 0.26 | 1.10 |
| Cold Crush Strength, psi | 7601 | 1790.8 | 719 | 2793 |
| Modulus of Rupture, psi | 1583 | 462.0 | 446 | 1212 |
| | | 3% Ammonium Chloride | | |
| Density lb/ft³ | 165.8 | 154.6 | 157.1 | 161.8 |
| Linear Shrinkage, % | 0 | 0.29 | 0.22 | 1.17 |
| Cold Crush Strength, psi | 4319 | 214.9 | 478 | 2775 |
| Modulus of Rupture, psi | 607 | 0 | 266 | 429 |
| | | Control (No Binder Added) | | |
| Density lb/ft³ | 162.6 | 159.4 | 160.0 | 167.3 |
| Linear Shrinkage, % | 0 | 0.22 | 0.29 | 1.44 |
| Cold Crush Strength, psi | 687 | 101.0 | 501 | 2779 |
| Modulus of Rupture, psi | 220 | 0 | 324 | 599 |

The non-residual binders included in the table exhibit exceptional strength in the range of 1,500° to 2,000°F. and are not detrimental to the refractoriness of the mass at high temperature.

Examination of the data reveals that the ammonium sulfate and ammonium chloride react with the pulverized MgO in the refractory to form upon drying a strong bond which is absent in the control. Upon firing at 1,500°F., the strength of these bonds compared to the control is further apparent. After the specimens are subjected to temperatures of 2,000°F., it is probable that sintering within the refractory is at least partially responsible for strength.

The data for samples fired at 3,000°F. demonstrate that the sulfate- and chloride-bonded materials exhibit at least as much cold crush strength as the control, and the sulfate-bonded material exhibits significantly higher modulus of rupture. These non-residual binders do not remain in the refractory mass after firing, and therefore cannot reduce the refractoriness of the product as do conventional binders. The linear shrinkage of both the sulfate- and chloride-bonded materials, after firing at 3,000°F., is significantly lower than the control, providing a more volume-stable refractory product.

The results of using magnesia (approximately 95% MgO) as the refractory grains in the basic refractory composition are typical of those obtained in practicing the invention. Similar results are obtained when substituting other basic refractory grains such as calcia, dolomitic lime, chrome ore and combinations thereof for the magnesia in the process. Any of the basic refractories mentioned, alone or in combination, produce products suitable for casting, ramming and gunning mixes. The basic refractory compositions obtained by practicing the improved method are substantially free from binder residue that would reduce the refractoriness of the end product. Even the chloride content is extremely low and in some instances non-existent.

On a dry weight basis, the improved refractory compositions contain from 90.0 to 99.5 percent of the basic refractory particles or grains, whether the binder is added by physical mixture or by chemical coating on the refractory grains. The binder may include a slip agent up to 5.0 percent of the binder weight. When binder and refractory are milled together, the quantity of refractory handled in this way may be from 1.0 to 10 percent based on the dry weight of the composition.

For end use, the basic refractory compositions are thoroughly mixed with water in amounts based upon the total dry weight of the mixture as follows:

3.0 to 8 percent for ramming
8.0 to 12.0 percent for casting or trowelling
10.0 to 40.0 percent for spraying or gunning These various applications are well known in the art and need not be explained in further detail.

What is claimed is:

1. The method of manufacturing a basic refractory shape, comprising the steps of intermixing 0.5 to 10 weight percent ammonium salt selected from the group consisting of ammonium chloride, ammonium bromide, ammonium iodide, ammonium sulfate, ammonium bisulfate, ammonium fluoride, ammonium fluosilicate, and ammonium fluosulfonate, with basic refractory particles to form an intimate mixture therewith, forming an aqueous dispersion of said mixture, disposing said mixture in a predetermined shape, and firing said shape at a temperature of about 1,500 to 3,300°F. to substantially drive off said ammonium salt from said predetermined shape of refractory particles whereby said shape exhibits high strength over a broad temperature range with a minimum of shrinkage.

2. The method of manufacturing a basic refractory shape according to claim 1 wherein said mixture is disposed in a predetermined shape by gunning in the form of a coating upon a surface.

3. The method of manufacturing a basic refractory shape according to claim 1 wherein said mixture is disposed in a predetermined shape by ramming into a cavity.

4. The method of manufacturing a basic refractory shape according to claim 1 wherein said mixture is disposed in a predetermined shape by casting in a mold.

5. The method of manufacturing a basic refractory shape according to claim 1 wherein said ammonium salt is milled to a fine grain.

6. The method of manufacturing a basic refractory shape according to claim 5 wherein a slip agent is intermixed with said ammonium salt during said milling.

7. The method of manufacturing a basic refractory shape according to claim 1 wherein a portion of said refractory particles and said ammonium salt are milled together.

8. The method of manufacturing a basic refractory shape according to claim 7 wherein a slip agent is intermixed with said ammonium salt during said milling.

9. The method of manufacturing a basic refractory shape according to claim 1 wherein said salt is ammonium sulfate.

10. The method of manufacturing a basic refractory shape according to claim 1 wherein said salt is ammonium chloride.

11. The method of manufacturing a basic refractory shape which includes dispersing ammonium hydroxide throughout a portion of refractory particles to form an intimate mixture therewith, intimately mixing aqueous hydrochloric acid throughout said mixture in stoichiometric proportion and drying to produce a 0.5 to 10 weight percent ammonium chloride coating on said refractory particles, wetting said coated particles with water, disposing said wet coated refractory particles in a predetermined shape, and firing said shape at a temperature of about 1,500 to 3,300°F. to substantially drive off said coating from said shape of refractory particles whereby said shape exhibits high strength over a broad temperature range with a minimum of shrinkage.

* * * * *